United States Patent [19]

Muraki et al.

[11] 3,940,373

[45] Feb. 24, 1976

[54] COPOLYAMIDE OF CAPROLACTAM

[75] Inventors: Toshio Muraki; Yasuo Miura; Hiroshi Kodama, all of Nagoya, Japan

[73] Assignee: Toray Industries, Inc., Tokyo, Japan

[22] Filed: Mar. 27, 1974

[21] Appl. No.: 455,056

[30] Foreign Application Priority Data

Apr. 14, 1973  Japan.................................. 48-41808

[52] U.S. Cl............ 260/78 L; 156/331; 260/33.4 R; 260/78 S
[51] Int. Cl.² .................. C08G 69/14; C08G 69/46
[58] Field of Search ........... 260/78 A, 78 L, 33.4 R, 260/78 S

[56] References Cited
UNITED STATES PATENTS

| | | | |
|---|---|---|---|
| 3,012,994 | 12/1961 | Bell et al. .......................... | 260/78 L |
| 3,607,610 | 9/1971 | Fukuma et al. ................ | 260/78 L X |
| 3,686,148 | 8/1972 | Fester et al. ................... | 260/78 L X |
| 3,703,595 | 11/1972 | Falkenstein et al. ........... | 260/78 L X |
| 3,787,371 | 1/1974 | Brinkmann et al............ | 260/78 L X |
| 3,839,121 | 10/1974 | Schmitt............................ | 260/78 A |

*Primary Examiner*—Lucille M. Phynes

[57] ABSTRACT

A novel copolyamide is obtained by copolymerizing a three-component system comprising ε-caprolactam; a salt of hexamethylenediamine and adipic acid; and a salt of 1,3-cyclohexanebis (methylamine) and adipic acid, in the specified proportions shown in the drawing.

The copolyamide is easily soluble in lower aliphatic alcohols and has good transparency. Solutions of the copolyamide in alcohol have superior stability.

2 Claims, 1 Drawing Figure

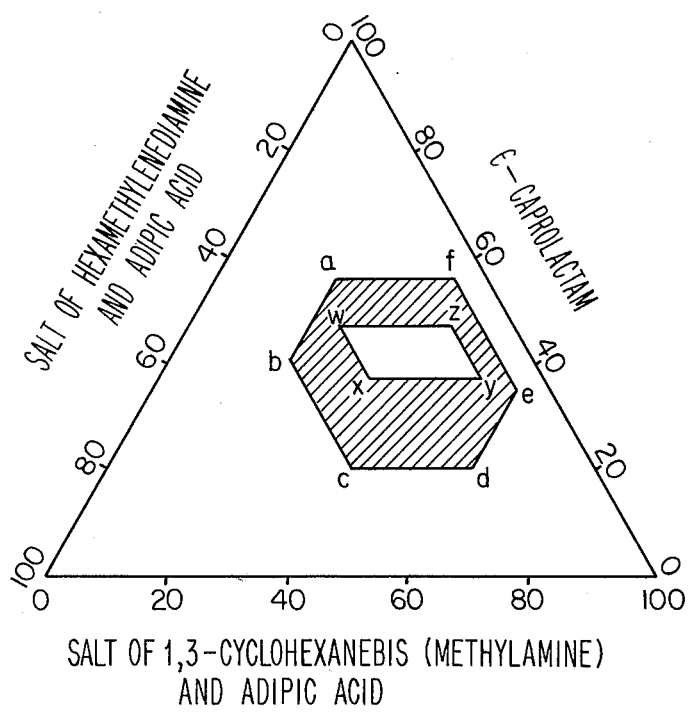
SALT OF 1,3-CYCLOHEXANEBIS (METHYLAMINE)
AND ADIPIC ACID

COPOLYAMIDE OF CAPROLACTAM

BACKGROUND OF THE INVENTION

This invention relates to a novel and useful copolyamide, in particular, an alcohol-soluble copolyamide having improved properties.

Generally, polyamides are difficult to dissolve in organic solvents. Only a few solvents such as phenol, formic acid and sulfuric acid can dissolve the usual polyamides.

In recent years, applications of polyamide solutions as adhesives, coating agents, casting films and so on have been developed on an industrial scale.

A polyamide which is soluble in lower alcohols, or mixtures of such alcohols with hydrocarbons, is usually used as the polyamide for these applications.

As a typical polyamide used for these applications, a copolyamide obtained by polymerizing a monomer mixture comprising $\epsilon$-caprolactam, hexamethylene diammonium adipate, and hexamethylenediammonium sebacate (so-called nylon 6/66/610) has been already proposed.

It has been found that this conventional copolyamide has serious disadvantages when it is used as an alcohol solution. Specifically, this conventional copolyamide is lacking in solution stability.

Generally, the polyamide is subjected to practical use as a 10–30 percent methanol solution. When such a methanol solution is stored at ambient temperature, the copolyamide precipitates from the solution, or the whole solution coagulates into a gel, and these difficulties are not avoidable.

The conventional copolyamide solution usually coagulates into a gel after one to three days storage. Therefore, it is necessary to prepare the solution in the quantity required for each usage at the time, or it is necessary to perform the troublesome step of re-dissolving the gelated solution by heating.

On the other hand, when the copolyamide solution is to be used as a coating agent for printed paper, for example, the resulting coating film is required to have good transparency. The conventional copolyamide does not provide a coating film having satisfactory transparency.

Accordingly, an object of this invention is to provide a novel and useful alcohol-soluble copolyamide having superior solution stability and good transparency.

SUMMARY OF THE INVENTION

A copolyamide is obtained by copolymerizing a three-component system in the proportions defined by the triangular coordinates in the area defined by points a, b, c, d, e and f of the accompanying drawing, the system comprising $\epsilon$-caprolactam; a salt of hexamethylenediamine and adipic acid; and a salt of 1,3-cyclohexanebis (methylamine) and adipic acid.

The points a, b, c, d, e and f of the drawing represent the following three component systems:

| Components \ Points | a | b | c | d | e | f |
|---|---|---|---|---|---|---|
| $\epsilon$-caprolactam | 55 wt% | 40 wt% | 20 wt% | 20 wt% | 35 wt% | 55 wt% |
| salt of hexamethylenediamine and adipic acid | 25 " | 40 " | 40 " | 20 " | 5 " | 5 " |
| salt of 1,3-cyclohexanebis (methylamine) and adipic acid | 20 " | 20 " | 40 " | 60 " | 60 " | 40 " |

DETAILED DESCRIPTION OF THE INVENTION

A novel copolyamide of this invention is obtained by copolymerizing a three component system comprising $\epsilon$-caprolactam, a salt of hexamethylenediamine and adipic acid, and a salt of 1,3-cyclohexanebis (methylamine) and adipic acid in the specified proportions.

The specified proportions are defined by the triangular coordinates in the area defined by points a, b, c, d, e and f of the drawing.

In this invention, $\epsilon$-aminocaproic acid or mixture of it with $\epsilon$-caprolactam can be used instead of $\epsilon$-caprolactam as the first component.

When $\epsilon$-aminocaproic acid is used as the first component, it must be used in a quantity corresponding to the weight percentage of $\epsilon$-caprolactam defined above.

If the proportions of the three components do not fall essentially within the range defined by points a, b, c, d, e and f, the resulting copolyamide will be found to have low solution stability and poor transparency.

Particularly preferred copolyamides with further improved solution stability are obtained by copolymerizing a three-component system in which the relative proportions are defined by the triangular coordinates in the area defined by the points w, x, y and z of the drawing. These points represent the systems:

| Components \ Points wt% | w | x | y | z |
|---|---|---|---|---|
| $\epsilon$-caprolactam | 47.5 | 37.5 | 37.5 | 47.5 |
| salt of hexamethylenediamine and adipic acid | 27.5 | 27.5 | 10.0 | 10.0 |
| salt of 1,3-cyclohexanebis (methylamine) and adipic acid | 25 | 35 | 52.5 | 42.5 |

The copolymerization or condensation reaction can be carried out by the procedure which is usually employed commercially in polymerizing nylon, the condensation reaction being carried out by heating at elevated temperatures.

The apparatus used may be either of the continuous or of the batch type.

In general, a homogeneously mixed aqueous solution of the starting materials, that is, the three components, which have been purified and prepared in advance, is charged into a reaction vessel and the condensation reaction is started. It is preferable to carry out the condensation reaction by heating at about 150°~250°C under elevated pressure for several hours and then heating at about 250°~280°C while removing the water from the reaction system by reducing the pressure gradually.

Such additives as modifiers of the degree of polymerization e.g. acetic acid and benzoic acid, heat resisting agents, pigments, and other conventional additives can be added in carrying out the condensation reaction.

The copolyamide of the invention does not need to have a specified degree of polymerization. Though a suitable relative viscosity of the copolyamide can be determined in view of its intended applications in every usage, the preferred relative viscosity is usually within the range from about 1.5 to 3.5 (as measured with respect to a solution of lg of the polymer in 100ml of 98 percent concentrated sulfuric acid at 25°C.)

The copolyamide obtained by this invention is easily soluble in aliphatic lower alcohols and has good transparency. Also, alcoholic solutions of the copolyamide have good stability. Furthermore, copolyamides of this invention have relatively low melting points.

Therefore, the copolyamides according to this invention are admirably suitable, for example, for the production of films, foils, threads, coatings and shaped articles of a great variety.

Typically, the copolyamide of this invention is used in the form of an alcoholic solution, for coatings. Because of the low melting point of the copolyamide, it may be used as a hot-melt type adhesive in the form of powder or tape.

In this invention, the solution stability of the copolyamide was measured by the change of the phase with respect to the solution prepared by dissolving 20g copolyamide in 100ml methanol when it was stored at ambient temperature.

In accordance with this invention, epoxide compounds or isocyanate compounds may be added according to the conventional practice.

The following examples will further illustrate this invention. However, the scope of the invention is not, of course, intended to be restricted to these Examples. All parts indicated in the Examples are by weight.

EXAMPLE 1.

A mixture of 40 parts of $\epsilon$-caprolactam, 30 parts of a salt of hexamethylenediamine and adipic acid, 30 parts of a salt of 1,3-cyclohexanebis (methylamine) and adipic acid and 20 parts of water is placed in an autoclave, and nitrogen is introduced and pressurized to a pressure of 5 atmospheres gauge and then the pressure is released. The nitrogen pressurizing operation is carried out three times. The system is sealed and heated for about 4 hours to 240°C, the pressure being kept at 10 atmospheres gauge by allowing an appropriate amount of steam to escape.

The pressure on the autoclave is then slowly released to atmospheric pressure over a period of 4 hours, while the system is heated to about 265°.

While keeping the whole at the same temperature, nitrogen is passed over the condensation mixtures at atmospheric pressure for another 2 hours.

After transferring the resulting melt from the autoclave into water, cutting into chips and drying in vacuo at 70°C for 15 hours, a transparent polyamide is obtained.

The polyamide has a relative viscosity of 2.63 (measured in a solution containing 1 g of polymer in 100 milliliters of 98 percent concentrated sulfuric acid at 25°C).

The softening temperature of the polyamide is 142°C (measured according to the method JIS K 6810). The redissolution temperature of the polyamide is 47°C (measured in a mixture consisting of 1 g of polymer and 100 milliliters of ethylene glycol, see F. R. Johnston, J. Textile Inst., Vol. 55, P.T 162).

This value is very low compared with well-known copolyamides, and indicates that the copolyamide has a high velocity of dissolution.

Heating the mixture of 20g of copolyamide and 100 milliliters of methanol gives a clear solution and the solution is stable for more than one month when allowed to stand at 23°C.

A cast film (30$\mu$in thickness) obtained by drying the above mentioned methanol solution in a 40°C oven under a nitrogen atmosphere is glossy and quite transparent.

The haze value of the film is 4 percent (measured by using the sphere method, H.T.R. meter Type SEP-H of Nihon Seimitus Kogaku Co., Ltd.)

COMPARATIVE EXAMPLE 1

A mixture of 40 parts of $\epsilon$-caprolactam, 45 parts of a salt of hexamethylenediamine and adipic acid, 15 parts of a salt of 1,3-cyclohexanebis (methylamine) and adipic acid and 20 parts of water is placed in an autoclave and polycondensed by the method described in Example 1.

The copolyamide is semi-transparent and has a relative viscosity of 2.76, a softening temperature of 152°C and a redissolution temperature of 52°C.

A solution consisting of 20g copolyamide and 100 milliliters methanol, when allowed to stand at 23°C, results in turbidity and then solidifies within a few days.

The haze value of the cast film (28$\mu$in thickness) is 10%.

EXAMPLES 2 TO 9 AND COMPARATIVE EXAMPLES 2 TO 6

Copolyamides incorporating various ratios of caprolactam (i.e., 6M), salt of hexamethylenediamine and adipic acid (i.e., HA salt) and salt of 1,3-cyclohexanebis (methylamine) and adipic acid i.e., HXA salt) as given below were prepared and characterized by the method described in Example 1. Results are summarized in Table 1.

TABLE 1

| | | starting material (wt%) | | | relative viscosity | softening temperature (°C) | solution stability (days) | haze value of film (%) |
|---|---|---|---|---|---|---|---|---|
| | | 6M | HA salt | HXA salt | | | | |
| Example | 2 | 50 | 25 | 25 | 2.56 | 143 | 15 | 14 |
| | 3 | 50 | 5 | 45 | 2.78 | 94 | 20 | 5 |
| | 4 | 45 | 25 | 30 | 2.67 | 143 | 100 | 5 |

TABLE 1-continued

|  |  | starting material (wt%) | | | relative viscosity | softening temperature (°C) | solution stability (days) | haze value of film (%) |
|---|---|---|---|---|---|---|---|---|
|  |  | 6M | HA salt | HXA salt |  |  |  |  |
|  | 5 | 40 | 40 | 20 | 2.82 | 155 | 4 | 15 |
|  | 6 | 40 | 25 | 35 | 2.73 | 148 | 100 | 4 |
|  | 7 | 40 | 15 | 45 | 2.76 | 95 | 100 | 6 |
|  | 8 | 30 | 35 | 35 | 2.87 | 137 | 7 | 9 |
|  | 9 | 30 | 20 | 50 | 2.66 | 104 | 23 | 5 |
| Comparative Example | 2 | 60 | 15 | 25 | 2.88 | 149 | 2 | 25 |
|  | 3 | 50 | 0 | 50 | 2.70 | 105 | 1 | — |
|  | 4 | 25 | 45 | 30 | 2.86 | 166 | 1 | — |
|  | 5 | 25 | 10 | 65 | 2.87 | 120 | 1 | — |
|  | 6 | 15 | 30 | 55 | 2.53 | 110 | 2 | 13 |

COMPARATIVE EXAMPLE 7

A copolyamide based on 35 parts of ε-caprolactam, 35 parts of a salt of hexamethylenediamine and adipic and 30 parts of a salt of hexamethylenediamine and sebacic acid is characterized by the method described in Example 1. Results are as follows: softening temperature: 160°C, redissolution temperature: 62°C, solution stability: 1 to 2 days, haze value of cast film: more than 25 percent.

COMPARATIVE EXAMPLE 8

A copolyamide based on 35 parts of ε-caprolactam, 35 parts of a salt of hexamethylenediamine and adipic acid and 30 parts of a salt of bis (4-amino cyclohexyl) methane and adipic acid is examined as above and had the following properties: softening temperature: 210°C, redissolution temperature: 91°C, solution stability: 1 to 2 days, haze value of cast film: 6 percent.

The following is claimed:

1. A copolyamide which is soluble in methanol at room temperature to give a stable solution, said copolyamide being obtained by copolymerizing a three-component system consisting essentially, in the proportions defined by the triangular coordinates in the area defined by points a, b, c, d, e and f of the accompanying drawing, of the system consisting essentially of 20 – 55 percent of ε-caprolactam; 5 – 40 percent of a salt of hexamethylenediamine and adipic acid; and 20 – 60 percent of a salt of 1,3-cyclohexanebis (methylamine) and adipic acid, such proportions being expressed as percentages by weight.

2. A copolyamide according to claim 1 wherein the proportions of the three components are defined by the triangular coordinates in the area defined by the points, w, x, y and z of the accompanying drawing.

* * * * *